(12) United States Patent
Sherkin et al.

(10) Patent No.: US 8,484,472 B2
(45) Date of Patent: Jul. 9, 2013

(54) SYSTEM AND METHOD OF FILTERING UNSOLICITED MESSAGES

(75) Inventors: Alexander Sherkin, Newmarket (CA); Viere Bibr, Kilbride (CA)

(73) Assignee: Research In Motion Limited, Waterloo, Ontario (CA)

( * ) Notice: Subject to any disclaimer, the term of this patent is extended or adjusted under 35 U.S.C. 154(b) by 1814 days.

(21) Appl. No.: 11/589,249

(22) Filed: Oct. 30, 2006

(65) Prior Publication Data

US 2008/0104674 A1 May 1, 2008

(51) Int. Cl.
*H04L 9/32* (2006.01)
(52) U.S. Cl.
USPC .................................. 713/170; 726/4; 726/22
(58) Field of Classification Search
None
See application file for complete search history.

(56) References Cited

U.S. PATENT DOCUMENTS

| | | | | |
|---|---|---|---|---|
| 5,638,448 | A * | 6/1997 | Nguyen | 380/29 |
| 6,230,269 | B1 * | 5/2001 | Spies et al. | 713/182 |
| 7,472,268 | B2 * | 12/2008 | Gray | 713/150 |
| 2004/0039919 | A1 * | 2/2004 | Takayama et al. | 713/180 |
| 2004/0203432 | A1 * | 10/2004 | Patil et al. | 455/67.11 |
| 2006/0137015 | A1 * | 6/2006 | Fahrny et al. | 726/26 |
| 2007/0121596 | A1 * | 5/2007 | Kurapati et al. | 370/356 |
| 2007/0143407 | A1 * | 6/2007 | Avritch et al. | 709/206 |
| 2007/0219926 | A1 * | 9/2007 | Korn | 705/67 |

\* cited by examiner

*Primary Examiner* — Nadia Khoshnoodi
(74) *Attorney, Agent, or Firm* — Gowling Lafleur Henderson LLP (57) ABSTRACT

A secure correlation identifier (SCID) for authentically correlating notifications received from event sources with subscriptions, a SCID authentication system and method of filtering unsolicited messages are provided. The SCID comprises a correlation identifier for making the SCID unique, a sequence of bits concatenated with the correlation identifier and a secure tag concatenated with the concatenation of the correlation identifier and the sequence of bits. The system comprises a SCID generator for generating a SCID to be used in a message and a SCID authenticator for authenticating the SCID. The method comprises the steps of receiving a notification message having a SCID, verifying that that SCID is authentic, accepting the message if the SCID is authentic and rejecting the message if the SCID is not authentic.

17 Claims, 7 Drawing Sheets

SYSTEM AND METHOD OF FILTERING UNSOLICITED MESSAGES

The present patent disclosure relates generally to distributed computer systems and in particular to a system and method of filtering unsolicited messages.

BACKGROUND

Often, a computer in a distributed system receives messages when certain events occur in other computers in the system. These messages are called notifications. In order to register interest in certain events, a subscriber computing device (called a subscriber or subscriber device) sends a subscription request that describes the events of interest to event source computing devices (called an event source or event source device) in the system. Subsequently, the subscriber device will receive notifications from the event source device when the events of interest occur.

Notifications are different from regular response messages. A regular response message is always a solicited message because a client can only receive a response message after it has sent a request message. On the contrary, a subscriber device can receive unsolicited notifications (similarly to electronic mail (email) spam).

Unsolicited notifications pose a problem to the systems that use subscription/notification message pattern because unsolicited notifications can irritate system users, corrupt system state, or even realize denial of service attack. Thus, it is desirable to have a mechanism to filter unsolicited notifications instead of processing them.

One approach of filtering unsolicited notifications is for a subscriber device to maintain a list of valid event source devices' Internet protocol (IP) addresses. When a notification is received, the subscriber device can check if the event source device's IP is contained in the valid IP list. If the event source device's IP address is contained in the valid IP list, the notifications will be accepted. Otherwise, the notification will be rejected. There are several problems with this approach:
  If IP address is faked, the filtering logic will fail to identify unsolicited notifications.
  If a valid notification is sent from a different machine, the filtering logic will reject a valid notification.
  It may not be practical or possible to maintain a list of valid event source devices' IP addresses. Even if the list will be populated by IP addresses of the machines accepting subscription messages, the list may not be accurate because notifications may be sent not by the same machine that accepted the corresponding subscriptions.

Another approach to filtering unsolicited notifications is for a subscriber device to filter notifications based on their content. For example, most email spam filters are content-based. There are several problems with this approach:
  Developing content-based notification filtering system is complex and expensive.
  Content-based notification system is slow since it has to parse the whole notification to make a decision whether to accept or reject the notification.
  Content-based notification systems are not accurate, i.e., invalid notifications are often not correctly recognized.
  Content-based notification system should be properly configured to be effective.

Yet another approach to filtering unsolicited notifications is for a subscriber device to maintain a list of valid correlation identifiers (IDs). When a notification is received, the subscriber device can check if the correlation ID in the notification is contained in the list of valid correlation IDs. If the correlation ID is contained in the list, the notification will be accepted. The notification will be rejected otherwise. There are several problems with this approach:
  Checking whether the list of valid correlation IDs contains the correlation ID received in the notification can be very expensive especially if the list is stored in the database, which is usually the case. The slow verification mechanism could be exploited by denial of service attack.
  Usually, correlation ID generation logic is quite simple (for example: 1, 2, 3 . . . ). Thus, a randomly chosen correlation ID would have a non-negligible chance of succeeding.

Thus, there is a need for a better approach to filtering unsolicited notifications.

BRIEF DESCRIPTION OF THE DRAWINGS

An embodiment of the patent disclosure will now be described by way of example only with reference to the following drawings in which.

DETAILED DESCRIPTION OF THE PREFERRED EMBODIMENT

In accordance with an embodiment of the present disclosure, there is provided a secure correlation identifier (SCID) for authentically correlating notifications received from event sources with subscriptions. The SCID comprises a correlation identifier for making the SCID unique, a sequence of bits concatenated with the correlation identifier and a secure tag concatenated with the concatenation of the correlation identifier and the sequence of bits.

In accordance with another embodiment of the present disclosure, there is provided a SCID authentication system for filtering unsolicited messages. The system comprises a SCID generator for generating a SCID to be used in a message and a SCID authenticator for authenticating the SCID.

In accordance with another embodiment of the present disclosure, there is provided a method of filtering unsolicited messages. The method comprises the steps of receiving a notification having a SCID, verifying that that SCID is authentic, accepting the message if the SCID is authentic and rejecting the message if the SCID is not authentic.

In accordance with another embodiment of the present disclosure, there is provided a computer program product for filtering unsolicited messages. The computer program product comprises a computer readable medium embodying program code means for implementing a method of filtering unsolicited messages. The method comprises the steps of receiving a notification message having a SCID, verifying that that SCID is authentic, accepting the message if the SCID is authentic and rejecting the message if the SCID is not authentic.

A system and method of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

A distributed computer system is a computer system that uses multiple computing devices in remote physical locations in order to accomplish a common objective or task. The computer devices in a distributed computer system communicate with each other by sending and receiving messages.

Often, a computing device in a distributed computer system wants to receive messages when certain events occur in other computing devices in the system. These messages are called notifications. In order to register interest in certain events, a subscriber computing device (sometimes referred to as a subscriber device or subscriber in this disclosure) sends a subscription request that describes the events of interest to an event source computing device (sometimes referred to as an event source device or event source in this disclosure) in the system. Subsequently, the subscriber device receives notifications from the event source device when the events of interest occur.

A subscription is the act of expressing interest in events and requesting notifications for when such events occur. Examples of subscriber devices and event source devices include any computing device where communication logic for the respective subscriber device and event source device are located. A subscriber device implements logic that is interested in receiving events and an event source device implements is logic that sends notifications that such events have occurred. The term device may include a single hardware component or a combination of a plurality of hardware components and a plurality of software components not necessarily located in close proximity to each other.

If a subscriber device has sent more than one subscription, the subscriber device will need a mechanism to correlate received notifications with the corresponding subscriptions. In order to correlate received notifications with the corresponding subscriptions, a correlation id is used. A correlation identifier (ID) is generated by the subscriber device and sent in a subscription message. Subsequently, every notification related to this subscription will include this correlation ID (CID).

Figure 1:
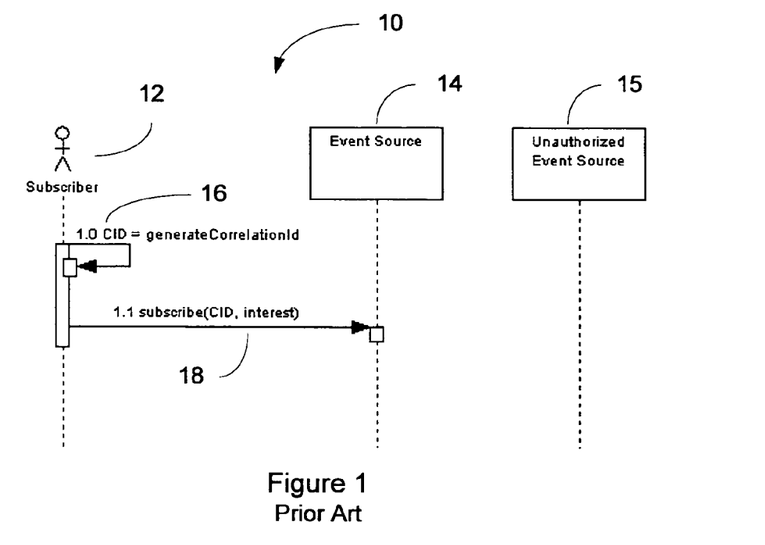
FIG. 1 shows in a sequence diagram an example of a standard subscription model.

FIG. 1 shows in a sequence diagram an example of a standard subscription model 10. The subscription model 10 comprises a subscriber 12 (i.e., subscriber device 12) and an event source 14 (i.e., event source device 14). The subscriber device 12 generates a correlation ID (CID) (16) and sends the correlation ID to the event source device 14 (18) to express interest in subscriptions from the event source device 14. Unfortunately, there are often unauthorized event source devices (15) present.

Figure 2:
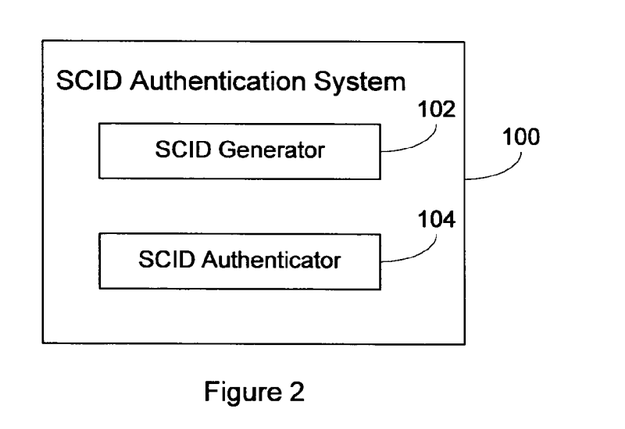
FIG. 2 shows in a component diagram an example of a secure correlation identifier (SCID) authentication system for filtering unsolicited messages, in accordance with an embodiment of the present patent disclosure.

FIG. 2 shows in a component diagram an example of a secure correlation ID (SCID) authentication system 100 for filtering unsolicited messages, in accordance with an embodiment of the present patent disclosure. The SCID authentication system 100 comprises a SCID generator 102 for generating SCIDs, and a SCID authenticator 104 for authenticating a SCID. Other components may be added to the SCID authentication system 100, including a subscription message listener for sending and receiving subscription messages and a subscription message parser for obtaining the SCID from a subscription message. Preferably, the components of the SCID authentication system 100 are implemented in a subscriber device 12. For wireless networks, it is advantageous to implement the SCID authentication system 100 in a proxy server between a subscriber device 12 and an event source device 14.

In one embodiment of the SCID authentication system 100, subscriber devices 12 generate secure correlation IDs (SCIDs). Each subscriber device 12 will generate its own authentic SCIDs so as to lower the possibility of another entity generating the subscriber device's authentic SCIDs. Advantageously, a randomly chosen SCID has a very low chance to be the subscriber device's authentic SCID. Additionally, the subscriber device 12 is able to quickly verify whether a given SCID is its authentic SCID without the need to maintain a list of valid SCIDs.

Figure 3:
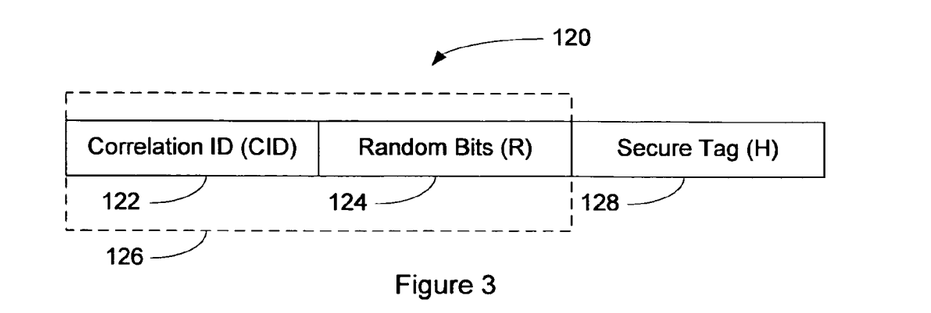
FIG. 3 shows in a component diagram an example of a SCID, in accordance with an embodiment of the SCID authentication system.

FIG. 3 shows in a component diagram an example of a secure CID (SCID) 120, in accordance with an embodiment of the SCID authentication system 100. The SCID 120 comprises a correlation ID (CID) 122 for making the SCID unique, concatenated with random bits (R) 124, all of which 126 is concatenated with the secure tag (H) 128.

Figure 4:
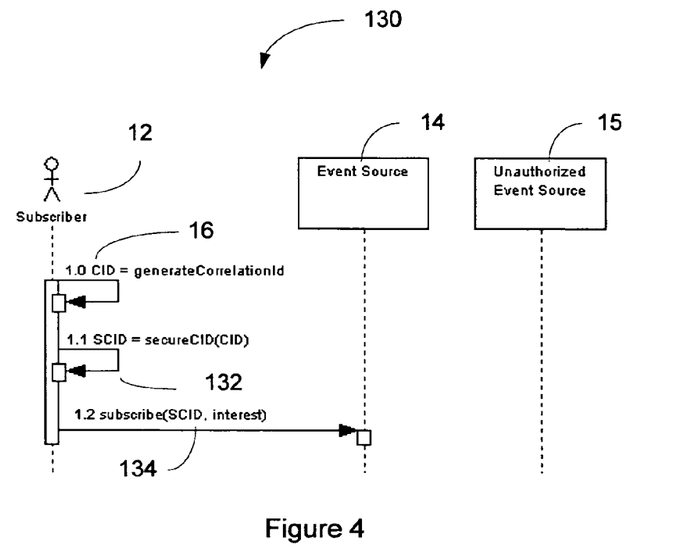
FIG. 4 shows in a sequence diagram an example of a method of subscribing to an event source device, in accordance with an embodiment of the SCID authentication system.

FIG. 4 shows in a sequence diagram an example of a method of subscribing to an event source device 14 (130), in accordance with an embodiment of the SCID authentication system 100. The SCID generator 102 generates a CID 122 (16). The SCID generator 102 secures the CID 122 into a SCID 120 (132). The SCID authentication system 100 sends the SCID to the event source device 14 (134) to express interest in subscriptions.

Figure 5:
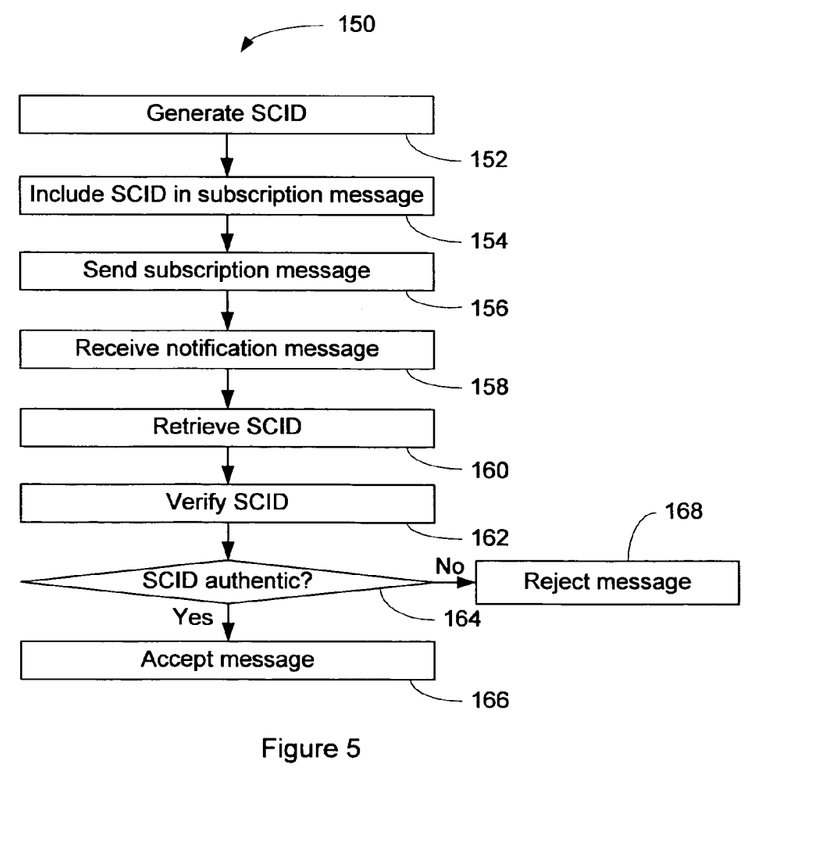
FIG. 5 shows in a flowchart an example of a method of filtering unsolicited messages, in accordance with an embodiment of the SCID authentication system.

FIG. 5 shows in a flowchart an example of a method of filtering unsolicited messages (150), in accordance with an embodiment of the SCID authentication system 100. When sending a subscription message, a SCID authentication system 100 generates an authentic SCID 120 (152), includes the SCID 120 in the subscription message (154), and sends the subscription message to an event source device 14 (156). When receiving a notification (158), the SCID authentication system 100 retrieves the SCID 120 from the notification (160), and verifies the authenticity of the SCID 120 (162), as described further below. If the SCID 120 is authentic (164), the notification is accepted (166). Otherwise, the notification is rejected (168). The method (150) is done. Other steps may be added to the method (150). Preferably, the mechanism to retrieve a SCID 120 from a notification and the SCID 120 verification mechanism are fast to prevent denial of service attacks.

Figure 6:
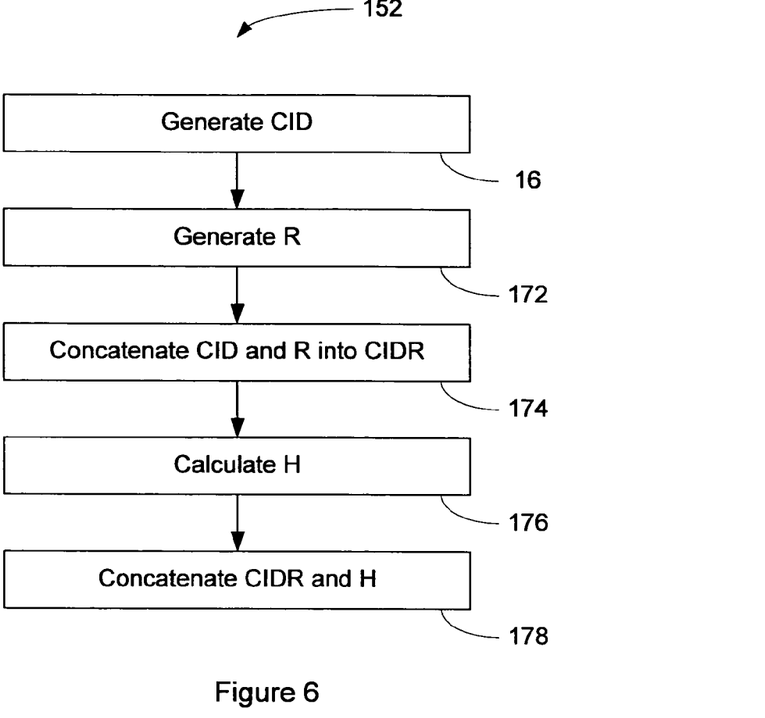
FIG. 6 shows in a flowchart an example of a method of generating an authentic SCID, in accordance with an embodiment of the SCID authentication system.

FIG. 6 shows in a flowchart an example of a method of generating an authentic SCID 120 (152), in accordance with an embodiment of the SCID authentication system 100. Preferably, each subscriber device 12 using the SCID authentication system 100 has a secret key (Ks). Ks can be a symmetric key (DES (Data Encryption Standard), 3DES (Triple DES), or AES (Advanced Encryption Standard)) required by the chosen Message Authentication Code (MAC) algorithm. Alternatively, Ks can be a public/private key pair (Rivest, Shamir and Adleman (RSA), Digital Signature Algorithm (DSA)) required by the chosen digital signature algorithm. Preferably, symmetric key cryptography is used since symmetric key cryptography is faster, and there is no need for public/private key cryptography.

A correlation ID (CID) 122 is generated (16) as is known in the art. Such CID 122 could be generated sequentially, i.e., C=0, 1, 2, 3, . . . . If the CIDs 122 are unique, SCIDs 120 will inherit this property and also be unique. A random sequence (R) of bits 124 is generated (172) using a secure random generator. The CID 122 and R 124 are concatenated to produce sequence of bits CIDR 126 (174). A secure tag (H) 128 is calculated (176), preferably using a MAC cryptographic function: H=MAC(CIDR, Ks), where MAC is a message authentication code cryptographic function, such as HMAC or cipher blocked chaining (CBC)-MAC. A MAC function takes two arguments: a sequence of bits 124 and a secret key. A MAC function produces a secure hash of the CIDR 126. Alternatively, H can be calculated using digital signature algorithms such as RSA or DSA: H=DigitalSignature(CIDR, Ks). The CIDR 126 and H 128 are concatenated to produce the authentic SCID 120 for the subscriber device 12 (178). The method (152) is done.

Alternatively, the SCID 120 could be produced without using the random sequence of bits (R). In this alternative embodiment, the CIDR would comprise only the CID. However, including the R, as in done in the preferred embodiment, provides two benefits: 1) extra uniqueness in case CIDs repeat; and 2) improved entropy of the MAC or digital signature argument CIDR, which improves the cryptographic strength of the SCID 120. For example, a secure hash function applied in the MAC or digital signature algorithm could produce stronger hash if its argument has a stronger entropy.

Figure 7:
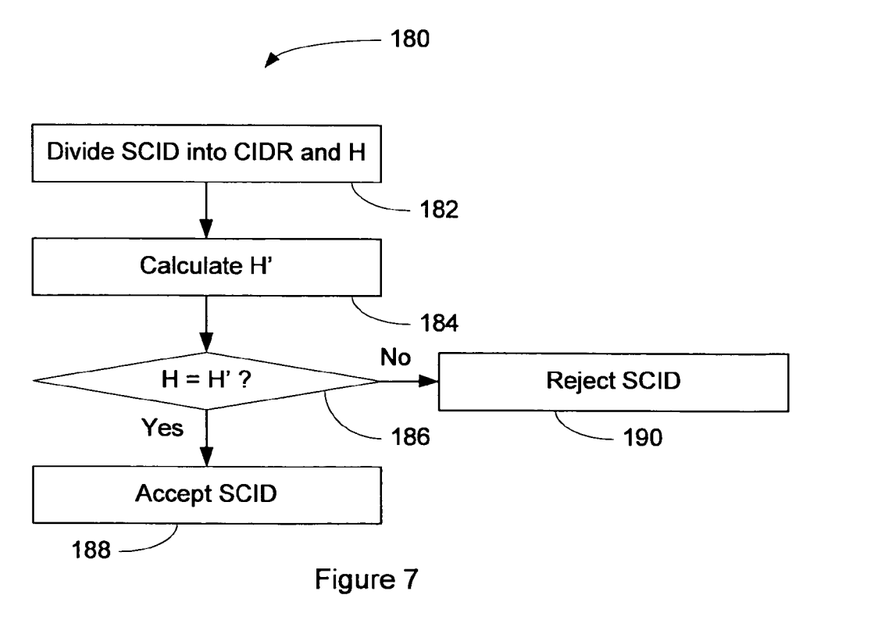
FIG. 7 shows in a flowchart an example of a method of verifying an authentic SCID, in accordance with an embodiment of the SCID authentication system.

FIG. 7 shows in a flowchart an example of a method of verifying an authentic SCID 120 (162), in accordance with an embodiment of the SCID authentication system 100. The SCID 120 is divided into CIDR 126 and H 128 (182). Preferably, the CIDR 126 and H 128 are of a predetermined format, e.g., such as a fixed length, to aid step (182). Preferably, H'=MAC(CIDR, Ks) is calculated (184). If H=H' (186), then the SCID is accepted (188) as authentic. Otherwise, the SCID is rejected (190). Other steps may be added to the method (180). Alternatively, if digital signature technology was used rather than MAC to generate the SCID 120, H' can be calculated as H'=DigitalSignature(CIDR, Ks).

As well as a SCID 120, a subscription message usually contains a subscriber universal resource locator (URL) where notifications for the subscription are sent. In order to improve the speed of SCID 120, the SCID 120 is preferably encoded in the URL. This way, when a notification is received (160), a subscriber device 12 implementing the SCID authentication system 100 is able to easily retrieve SCID 120 from the URL. For web service (WS)-Eventing, the SCID 120 is contained in a simple object access protocol (SOAP) message. Thus, parsing extensible markup language (XML) is used in WS-Eventing to retrieve the SCID 120. Since XML parsing is expensive, this approach to SCID 120 retrieval is slow. Advantageously, if the SCID 120 is encoded in the URL, no XML parsing is necessary to retrieve the SCID.

Since the SCID 120 verification (162) is fast, invalid SCIDs 120 are quickly identified and rejected. Thus, advantageously, the probability of carrying out a successful denial of service attack with invalid SCIDs 120 is reduced. Moreover, since the probability of correctly guessing a valid SCID is low, a brute force attack against SCIDs 120 generated and used in the SCID authentication system 100 is also not feasible.

Figure 8:
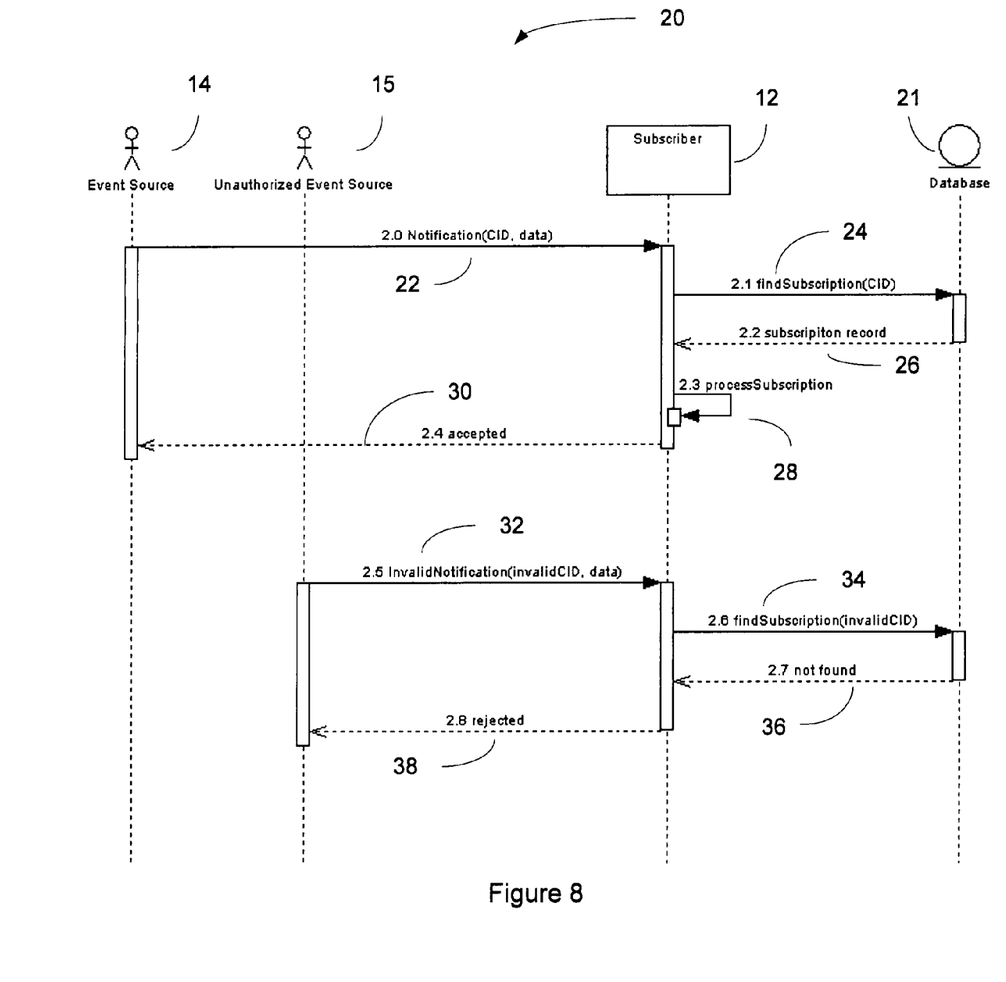
FIG. 8 shows in a sequence diagram a standard model of processing a notification received from event source devices.

FIG. 8 shows in a sequence diagram a standard model of processing a notification (20) received from event source devices. An event source device 14 sends a notification message (22) having a CID 122 and data as arguments to a subscriber device 12. The subscriber device 12 sends a method call to a database 21 to find the subscription for the CID 122 (24). The database 21 returns a subscription record (26). An example of a subscription record comprises information pertaining to a particular subscription. The subscription is processed (28) and the notification is accepted (30). When an invalid notification having an invalid ID and data as arguments is sent (32) by an unauthorized event source device 15, the subscriber device 12 sends a method call to the database 21 to find the subscription for the invalid ID (34). The database 21 returns an error message (36). Since no subscription is found for the invalid ID, the notification is rejected (38). Since invoking a method call to the database 21 is expensive, the standard model 20 is subject to denial of service attacks.

Figure 9:
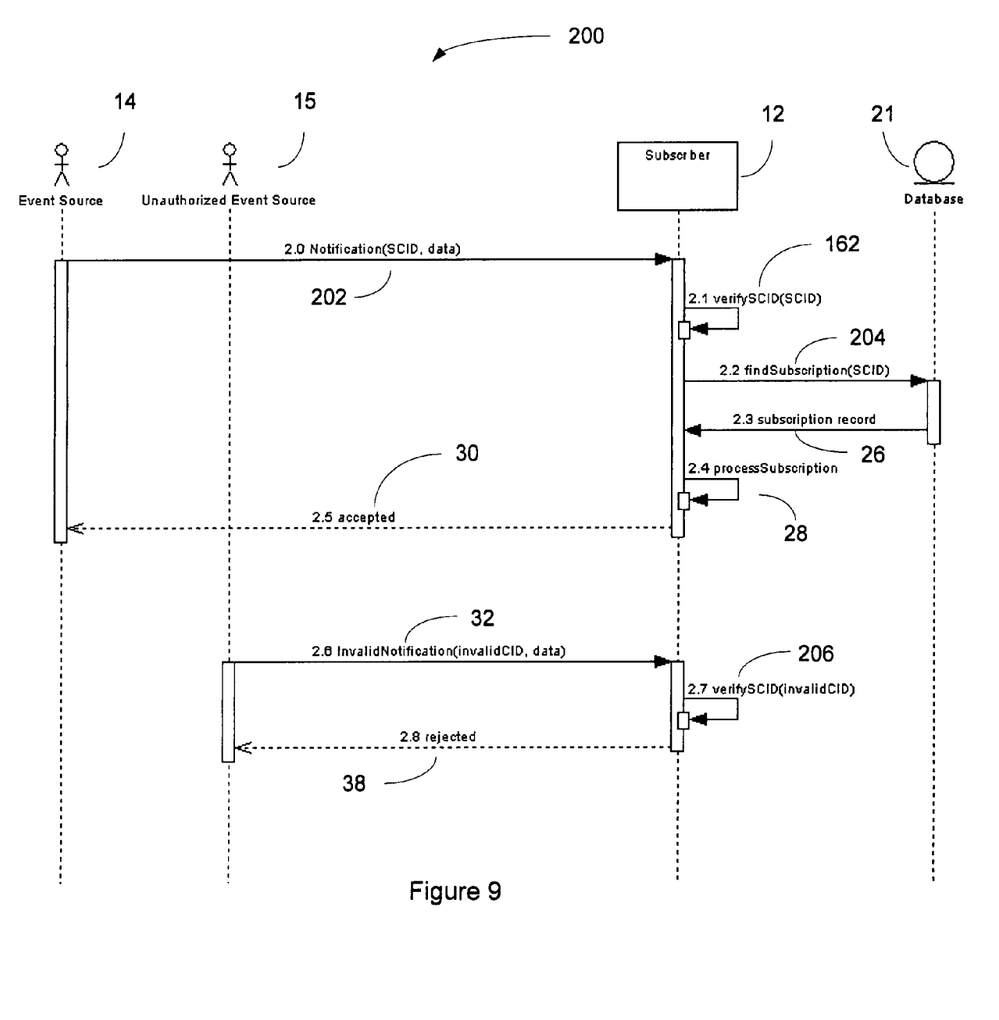
FIG. 9 shows in a sequence diagram an example of a method of processing a notification received from event source devices, in accordance with an embodiment of the SCID authentication system.

FIG. 9 shows in a sequence diagram an example of a method of processing a notification (200) received from event source devices, in accordance with an embodiment of the SCID authentication system 100. A subscriber device 12 receives a notification message having a SCID 120 and data as arguments from an event source device 14 (202). The subscriber device verifies the SCID 120 (162) and sends a method call to a database 21 to find the subscription for the SCID 120 (204). The method call may pass the SCID 120 or the CID 122 to the database 21 as a lookup key. The database 21 returns the subscription record (26), the subscription is processed (28) and the notification is accepted (30). When an invalid notification having an invalid SCID and data as arguments is sent (32) by an unauthorized event source device 15, the subscriber device 12 attempts to verify the invalid SCID (206). Since the SCID is invalid, the notification is rejected (38). Advantageously, the expensive step of invoking a method call to the database 21 is avoided in this sequence for invalid SCIDs. Thus, the probability of carrying out a successful denial of service attack with invalid SCIDs 120 is reduced.

A mechanism to detect stolen SCIDs may also be implemented in the SCID authentication system 100 and method of filtering unsolicited messages (150). A notification counter may be added to the SCID authentication system 100. The notification counter monitors the number of notifications (messages) received per minute per SCID per IP address. If the notification rate exceeds a predetermined threshold for a given SCID and IP address, the SCID is deemed to have been stolen and it is assumed that an unauthorized machine is spamming the subscriber device 12 from this IP address. Messages from this IP address are then blocked to prevent the unsolicited messages and allow the legitimate owner of the SCID to continue to send notifications from their IP address. Alternatively, the SCID may be deemed no longer authentic and the subscriber device 12 may send a new subscription request.

It is preferable where possible for a given subscription protocol to implement an expiry mechanism for the SCIDs to reduce the SCID lifespan. For example, the WS-Eventing protocol supports a subscription expiry. The SCID authentication system 100 may further check expiry information (e.g., expiry date, expiry time, maximum number of allotted uses, etc.) for a SCID. If the SCID has expired, then any notification having the SCID will be rejected. Advantageously, having SCIDs that expire reduces the chance that a SCID will be stolen and/or used successfully in an attack.

Advantageously, the method of retrieving a SCID 120 (160) from a notification and the method of SCID 120 verification (162) are fast. Moreover, it is not required to maintain the list of valid SCIDs for verification purposes. Since the SCID authentication system 100 is not based on IP filtering, the system 100 is independent of the network configuration and the event source device deployment model. Event source devices 14 may have no knowledge that subscriber devices 12 have a notification filtering mechanism in place. Thus, the SCID authentication system 100 may be transparently implemented in subscriber devices 12.

Advantageously, the filtering mechanism (SCID authentication system 100) makes no assumptions about the underlying protocol because the message filtering mechanism (SCID authentication system 100) is based on a correlation ID notion that is a fundamental part of the subscription/notification message model implementation. For example, the mechanism (SCID authentication system 100) will work with a WS-Eventing protocol. However, even if certain subscription/notification message model protocols do not have a notion of a correlation ID, such CID could be implemented by encoding the SCID or CID in a uniform resource locator where notifications (i.e., notification messages) are sent for the subscription. Consequently, the SCID or CID can be decoded and extracted from the URL when notifications are received.

Any device in a network can be a subscriber device 12 and/or event source device 14. In a wireless network, typically the handheld device would be the subscriber device 12 and a back-end service (such as a web service, enterprise service or other back-end service) server would be the event source device 14. However, it is possible for a handheld device to be an event source device 14 and a back-end service server to be subscriber device 14.

The SCID authentication system 100 may be implemented in a listener of a message communication system. The listener could be part of a communication service on a device or stored in a library and called as needed. In wireless devices, the SCID authentication system 100 is preferably implemented in a listener in a gateway server (i.e., proxy) between a subscriber device 12, and an event source device 14. Alternatively, components of the SCID authentication system 100 may be implemented in the subscriber device 12.

Figure 10:
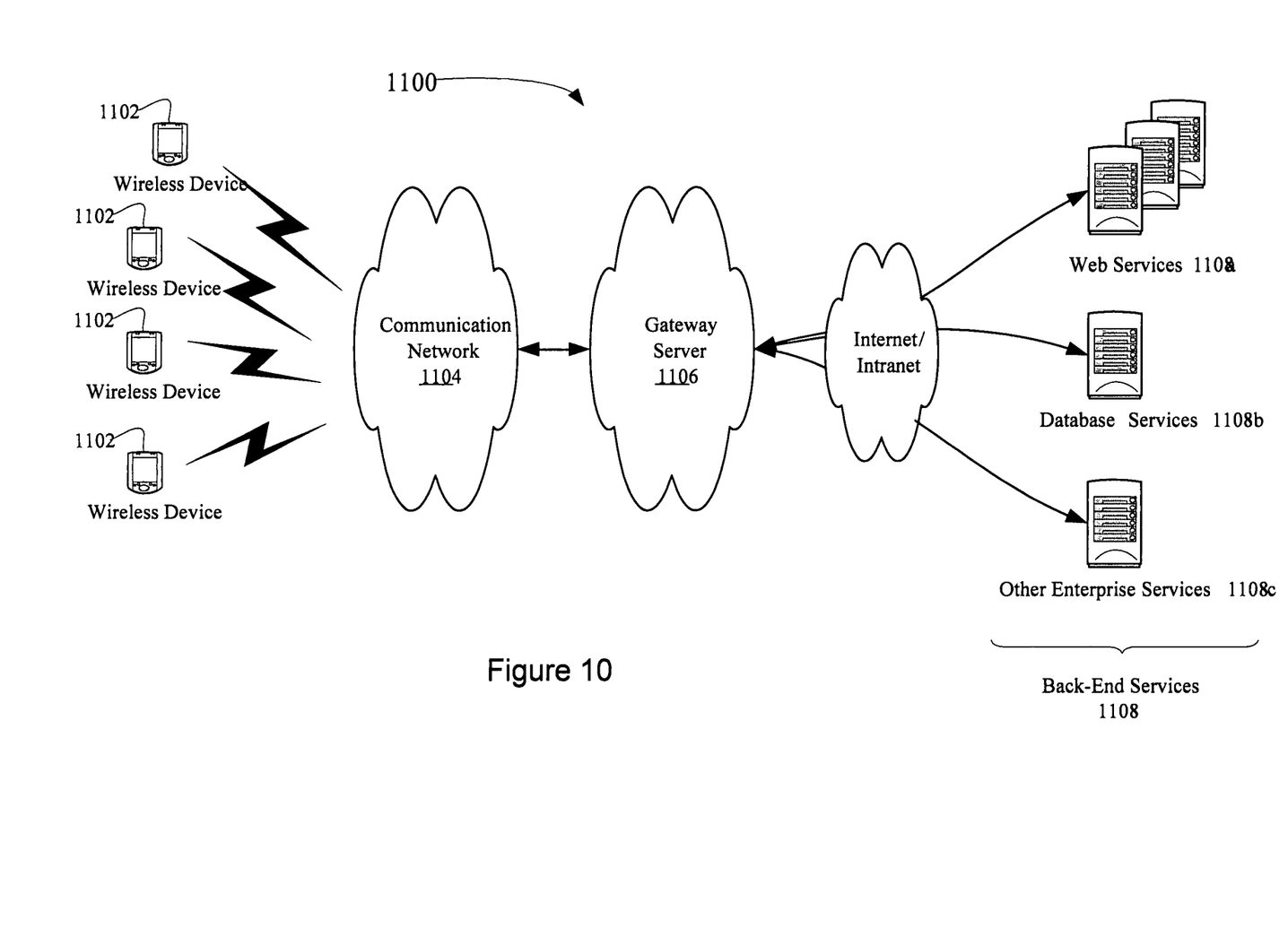
FIG. 10 shows in a detailed block diagram an example of a communication infrastructure.

Referring to FIG. 10, an example of a wireless communication infrastructure is illustrated generally by numeral 1100. The communication infrastructure 1100 comprises a plurality of wireless devices 1102, a communication network 1104, a gateway server 1106, and a plurality of back-end servers 1108. The back-end servers 1108 can also act as event source devices 14, 15 and/or subscriber devices 12. Preferably, the SCID authentication system 100 is implemented in the gateway server 1106.

The wireless devices 1102 are typical personal digital assistants (PDAs), but may include other devices. Each of the wireless devices 1102 includes a plurality of applications or a container or runtime environment capable of hosting a plurality of applications.

The wireless devices 1102 are in communication with the gateway server 1106 via the communication network 1104. Accordingly, the communication network 1104 may include several components such as a wireless network, a relay, a corporate server and/or a mobile data server for relaying data between the wireless devices 1102 and the gateway server 1106.

The gateway server 1106 acts as a message broker between the wireless devices 1102 and the back-end servers 1108. The gateway server 1106 is further in communication with a plurality of the back-end services 1108, such as Web services 1108*a*, database services 1108*b*, as well as other enterprise services 1108*c*, via a suitable link. For example, the gateway server 1106 is connected with the Web services 1108*a* and database services 1108*b* via simple object access protocol (SOAP) and Java database connectivity (JDBC) respectively. Other types of back-end services 1108 and their corresponding links can be connected to the gateway server 1106.

Figure 11:
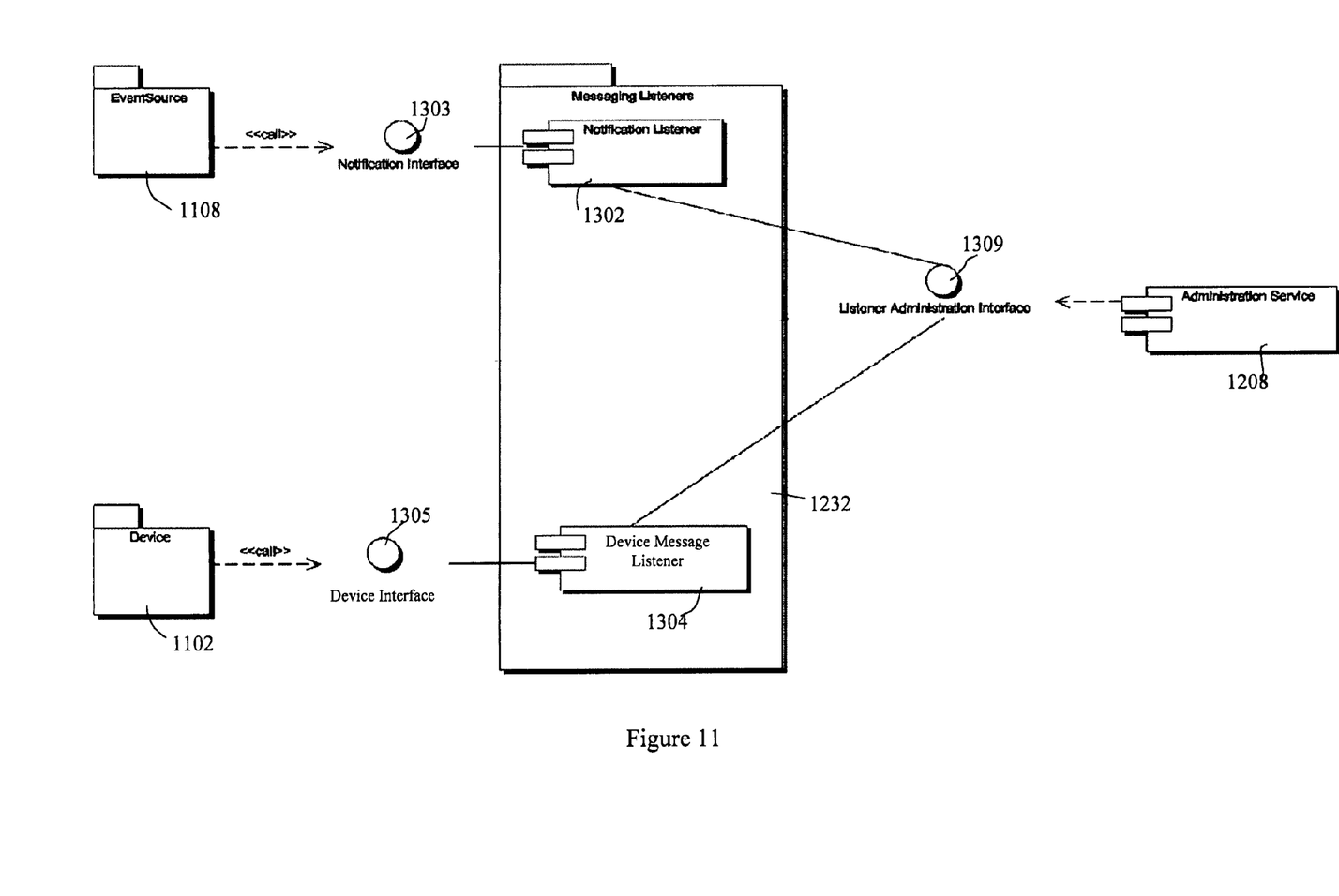
FIG. 11 shows in a block diagram an example of a message listening application.

Referring to FIG. 11, an example of a message listening application 1232 is shown. The message listening application 1232 includes three listeners; a notification listener 1302 and a device message listener 1304. The notification listener 1302 receives notification and response messages from event source devices 1108*c* via a notification interface 1303. Other message listener interfaces may be added.

In one embodiment, the notification interface 1303 may be implemented using Web Service (WS)-Eventing. Web services often want to receive messages when events occur in other services, such as the event source devices, and applications. A mechanism for registering interest is provided in the art by WS Subscription. WS Subscription defines a protocol for one Web service, referred to as a subscriber device, to register interest with another Web service, referred to as an event source device for receiving messages about events, referred to as notifications. When the event source device notifies the subscriber device of an event, it is referred to as WS Eventing.

In the present embodiment the listener interfaces 1303, 1305, and 1309 are configured using Hypertext Transfer Protocol/Hypertext Transfer Protocol over Secure Socket Layer (HTTP/HTTPS). However, these protocols have been selected as a design choice and other protocols may be used when desired. Accordingly, external systems transmit a HTTP/HTTPS request, which is received by the appropriate listener. The listener takes the message, makes minimal transformations, and forwards it to the messaging subsystem 1224. The transformations include copying HTTP header information into message object fields. For example, the HTTP header information may identify the wireless device 1102 from which the message originated.

The systems and methods according to the present patent disclosure may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed is:

1. A method in a subscriber device for filtering unsolicited notification messages, the method comprising:
   generating, at a subscriber device, a subscriber secure correlation identifier (SCID) associated with a subscription to a subscribed event source, wherein the subscriber SCID comprises a randomized correlation identifier and a secure tag, wherein the secure tag is generated using the randomized correlation identifier and a device encryption key associated with the subscriber device; and providing the subscriber SCID to the subscribed event source in a subscription message;

receiving, at the subscriber device, a notification message upon occurrence of an event, the notification message having an event-source SCID comprising a first portion and a second portion;

verifying, in the subscriber device, that the notification message is from the subscribed event source if the second portion of the event-source SCID is equal to a secure hash of the first portion of the event-source SCID, wherein the secure hash is generated using the first portion and the device encryption key; and accepting the notification message if the notification message is verified as being from the subscribed event source.

2. The method as claimed in claim 1, wherein the verifying comprises:

retrieving the event-source SCID from the notification message;

dividing the event-source SCID into the first portion and the second portion;

determining that the notification message is from the subscribed event source if the second portion is equal to a secure hash of the first portion; and determining that the notification message is not from the subscribed event source if the second portion is not equal to a secure hash of the first portion.

3. The method as claimed in claim 2, wherein the retrieving the event-source SCID comprises obtaining the event-source SCID from a uniform resource locator.

4. The method as claimed in claim 2, wherein the first portion and the second portion are divided from the event-source SCID using a predetermined function.

5. The method as claimed in claim 2, wherein dividing the event-source SCID comprises parsing a predetermined length of the event-source SCID to obtain the first portion, the remainder being the second portion.

6. The method as claimed in claim 2, wherein dividing the event-source SCID comprises parsing a predetermined length of the event-source SCID to obtain the second portion, the remainder being the first portion.

7. The method as claimed in claim 1, wherein generating the subscriber SCID comprises:

generating a correlation identifier (CID) for the subscription;

generating a sequence of random bits (R);

concatenating the correlation identifier with the sequence of bits resulting in a CIDR;

generating a sequence of secure tag bits (H) by performing a secure tag function on the CIDR and the device encryption key; and concatenating the CIDR with the H.

8. The method claimed in claim 7, wherein the secure tag function is a message authentication code function.

9. The method claimed in claim 7, wherein the secure tag function is a digital signature function.

10. The method as claimed in claim 1, further comprising:

listening for the notification message from the event source; and forwarding an accepted notification message to a messaging subsystem of the subscriber device.

11. The method as claimed in claim 1, further comprising:

monitoring a notification rate of notification messages received per minute per event-source SCID per Internet protocol (IP) address; and blocking notification messages from IP addresses if the notification rate exceeds a predetermined threshold for a given event-source SCID and IP address.

12. The method as claimed in claim 1, further comprising:

checking expiry information of the subscriber SCID; and rejecting notification messages having an expired subscriber SCID.

13. The method of claim 1, further comprising:

rejecting the notification message if the notification message is not verified as being from the subscribed event source.

14. A secure correlation identifier (SCID) authentication system in a subscriber device for filtering unsolicited notification messages, the SCID authentication system comprising:

a message listener configured to receive a notification message upon occurrence of an event, the notification message having an event-source SCID comprising a first portion and a second portion; and a SCID authenticator configured to:

generate a subscriber SCID associated with a subscription to a subscribed event source, wherein the subscriber SCID comprises a randomized correlation identifier and a secure tag, wherein the secure tag is generated using the randomized correlation identifier and a device encryption key associated with the subscriber device; and provide the subscriber SCID to the subscribed event source in a subscription message;

upon the message listener receiving the notification message, verify that the notification message is from the subscribed event source if the second portion of the event-source SCID is equal to a secure hash of the first portion of the event-source SCID, wherein the secure hash of the first portion is generated using the first portion and the device encryption key; and accept the notification message if the notification message is verified as being from the subscribed event source.

15. The SCID authentication system as claimed in claim 14, further comprising a message parser for obtaining the event-source SCID from the notification message.

16. The SCID authentication system as claimed in claim 14, further comprising a notification counter for monitoring a notification rate of notification messages received per minute per event-source SCID per Internet protocol (IP) address.

17. A computer program product for filtering unsolicited messages, the computer program product comprising a non-transitory computer readable medium embodying program code means for implementing a method in a subscriber device for filtering unsolicited notification messages, the method comprising:

generating, at a subscriber device, a subscriber secure correlation identifier (SCID) associated with a subscription to a subscribed event source, wherein the subscriber SCID comprises a randomized correlation identifier and a secure tag, wherein the secure tag is generated using the randomized correlation identifier and a device encryption key associated with the subscriber device; and providing the subscriber SCID to the subscribed event source in a subscription message;

receiving a notification message upon an occurrence of an event, the notification message having an event-source SCID comprising a first portion and a second portion;

verifying that the notification message is from the subscribed event source if the second portion of the event-source SCID is equal to a secure hash of the first portion of the event-source SCID, wherein the secure hash is generated using the first portion and the device encryption key;

accepting the notification message if the notification message is verified as being from the subscribed event source.

\* \* \* \* \*